United States Patent
Kumar et al.

(10) Patent No.: US 8,798,580 B2
(45) Date of Patent: Aug. 5, 2014

(54) METHOD AND SYSTEM FOR ACTIVATING SERVICES ON A WIRELESS TERMINAL

(75) Inventors: Nanda Kumar, Parsippany, NJ (US); Arulvadivel Venugopal, Franklin Park, NJ (US); Ryan Paul Stewart-Gardiner, Budd Lake, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 425 days.

(21) Appl. No.: 12/886,938

(22) Filed: Sep. 21, 2010
(Under 37 CFR 1.47)

(65) Prior Publication Data
US 2012/0071139 A1    Mar. 22, 2012

(51) Int. Cl.
| | |
|---|---|
| H04M 3/42 | (2006.01) |
| G06F 15/16 | (2006.01) |
| G06F 9/445 | (2006.01) |
| H04W 8/18 | (2009.01) |
| H04L 12/28 | (2006.01) |
| H04L 29/08 | (2006.01) |

(52) U.S. Cl.
CPC ............. *H04W 8/18* (2013.01); *H04L 67/16* (2013.01); *H04L 12/2812* (2013.01)
USPC ........ 455/411; 455/414.1; 709/203; 709/219; 379/201.01; 717/174

(58) Field of Classification Search
CPC .......... H04W 4/00; H04W 8/18; H04L 67/16; H04L 67/18; H04L 67/04; H04L 67/34; H04L 12/2812
USPC .......... 379/201.01, 201.02, 201.05; 455/410, 455/411, 414.1, 418, 419, 425; 713/100
See application file for complete search history.

(56) References Cited

U.S. PATENT DOCUMENTS

| | | | |
|---|---|---|---|
| 7,305,090 B1 * | 12/2007 | Hayes et al. | 380/249 |
| 7,353,017 B2 * | 4/2008 | Chen et al. | 455/414.2 |
| 7,565,141 B2 * | 7/2009 | Macaluso | 455/419 |
| 7,613,479 B2 * | 11/2009 | Twigg et al. | 455/558 |
| 2003/0003933 A1 * | 1/2003 | Deshpande et al. | 455/510 |
| 2009/0138876 A1 * | 5/2009 | Chang | 717/176 |
| 2010/0088367 A1 * | 4/2010 | Brown et al. | 709/203 |
| 2010/0088696 A1 * | 4/2010 | Stoev et al. | 717/178 |
| 2013/0132526 A1 * | 5/2013 | Kinoshita et al. | 709/219 |

* cited by examiner

*Primary Examiner* — Nizar Sivji

(57) ABSTRACT

A method and apparatus for setting a wireless terminal for a service are disclosed. The wireless terminal automatically sends identification information to a server by dialing a predetermined number. Upon receiving the identification information, the server finds customer information corresponding to the identification information, and determines one or more services which are available on the wireless terminal. The server sends service information indicating the available services. The wireless terminal displays a list of the available services, and upon detecting a selection of an available service, sends a request to transfer an application program for setting up the selected service to the server. The wireless terminal executes the downloaded application program and displays guidance for setting up the available service. In response to user inputs based on the displayed guidance, the selected service is activated and set-up in the wireless terminal.

22 Claims, 6 Drawing Sheets

FIG. 5A
FIG. 5B
FIG. 5C
FIG. 5D

```
<FeatureSetupResponse>
        <SubscribedFeatures>
                <Feature>
                        <Id>VVM</Id>
                        <Setup>false</Setup>
                        <Name><![CDATA[Visual Voice Mail]]></Name>
                        <Info><![CDATA[Visual Voice Mail is an application
that allows subscribers to view caller and voice mail information and listen to voice mail messages in
any order on their wireless device. Scroll through your messages, pick the ones you want to listen to,
erase or archive them right from your screen on your wireless device.]]></Info>
                        <Image>{lengthy image data removed for this
document}</Image>
                <//Feature>
                <Feature>
                        <Id>VZN</Id>
                        <Setup>false</Setup>
                        <Name><![CDATA[VZ Navigator]]></Name>
                        <Info><![CDATA[VZ Navigator tells you precisely
where you are and what's nearby, providing turn-by-turn directions to get to your destination on
time]]></Info>
                        <Image>{lengthy image data removed for this
document}</Image>
                <//Feature>
                <Feature>
                        <Id>FF</Id>
                        <Setup>True</Setup>
                        <Name><![CDATA[Friends & Family]]></Name>
                        <Info><![CDATA[With Friends & Family call any
number, any network, any time - and never use your plan minutes]]></Info>
                        <Image>{lengthy image data removed for this
document}</Image>
                <//Feature>
        </SubscribedFeatures>
        <RecommendedFeatures>
                <Feature>
                        <Id>TestMan</Id>
                        <Setup>false</Setup>
                        <Name><![CDATA[Test Man]]></Name>
                        <Info><![CDATA[In the rare instance when a call is
dropped Test Man will identify and launch to the phones foreground screen and display the call
information to the user. User can chose to report the dropped call data to VZW]]></Info>
                        <Image>{lengthy image data removed for this
document}</Image>
                <//Feature>
                <Feature>
                        <Id>MV</Id>
                        <Setup>false</Setup>
                        <Name><![CDATA[My Verizon]]></Name>
                        <Info><![CDATA[My Verizon makes self-serve
easier and more convenient than ever before. It allows Account Owner and end users who have been
authorized to access these functions to access self-serve functionality directly from your
handset]]></Info>
                        <Image>{lengthy image data removed for this
document}</Image>
                <//Feature>
        </RecommendedFeatures>
</FeatureSetupResponse>
```

FIG. 7

METHOD AND SYSTEM FOR ACTIVATING SERVICES ON A WIRELESS TERMINAL

TECHNICAL FIELD

The present disclosure relates to a method and equipment for automatically setting-up selected services or features on a wireless terminal, for example, a wireless phone, without complex user interactions.

BACKGROUND

Currently, a customer who purchases his/her wireless terminal online receives a wireless terminal with instructions to manually dial a designated number to initialize and activate the wireless terminal for services and to update their preferred roaming list (PRL). For example, the customer is instructed to dial *228 for the initialization. Likewise, a customer who purchases a wireless terminal in a retail store has the store representative manually dial *228 and initialize the wireless terminal. In another case, a customer may have to access a designated website to activate his/her wireless terminal.

Further, if the customer purchases services to subscribe, the customer has to activate and set up the subscribed services manually or has the store representative set up the wireless terminal for the services in the retail store location. Examples of the services for a wireless terminal may include Visual Voice Mail, email, wireless synch email, and so on.

In addition, not all customers have a rate plan that is eligible for special discount programs, for example, Verizon Wireless' Friends and Family® (F&F) service. Some customers may not even know that such discount programs are available as an option. Even if the customer has the rate plan that is eligible for the F&F service, he/she may not activate that service because the customer may not know that the rate plan is eligible for the F&F service, the customer may not remember that the rate plan is eligible for the F&F service, or the customer may not know how to activate the F&F service. Thus, some of the customers do not take advantage of the savings the F&F service affords them.

Moreover, not all customers are familiar with the services provided or application programs available on the wireless terminals. Such customers may not know if the service is available or what features the service can provide. Thus, the customer has to find the service or how to use the service through self-discovery or by instruction from store or call center representatives, which may be very inconvenient for the customer. Accordingly, there is a need to easily and properly activate and configure a wireless terminal for the subscribed services.

SUMMARY

The teachings herein alleviate one or more of the above noted problems with a method and systems for activating or setting up a service available on the wireless terminal by downloading an application program to the wireless terminal. One example is a method for setting a wireless terminal for a service. The wireless terminal automatically sends identification information identifying the wireless terminal to a server by automatically dialing a predetermined number. Upon receiving the identification information, the server finds stored customer information corresponding to the identification information. Based on the customer information, the server determines one or more services which are available on or through the wireless terminal. The server then sends service information indicating those available services to the wireless terminal. The wireless terminal displays a list of the one or more available services. Upon detecting a selection of an available service from the one or more displayed available services, the server sends an application program for setting up the selected available service. The wireless terminal may display guidance for setting up the selected available service according to the application program. In response to user inputs based on the displayed guidance, the selected available service is set up and activated in the wireless terminal.

In another example, a wireless terminal includes a wireless transceiver for communication via a wireless network, a processor coupled to the wireless transceiver, a user interface coupled to and controlled by the processor for presenting information to a user and receiving input from the user, and a storage device storing a program. The program, i.e., a resident program, includes instructions which, when executed by the processor, cause the wireless terminal to perform several functions. The wireless terminal automatically initiates communication through the wireless network using a predetermined number, for establishing communication between the wireless terminal and a server. The wireless terminal sends identification information identifying the wireless terminal to the server, and receives service information indicating one or more services which are available on or through the wireless terminal corresponding to the identification information. The wireless terminal displays a list of the one or more available services; and upon detecting a user selection of an available service from the displayed one or more available services displayed on the wireless terminal through the user interface, the wireless terminal sends a request to the server. The wireless terminal can then download an application program for setting up and utilizing the selected available service. Based on the downloaded application program, the wireless terminal may display guidance for setting up the selected available service, and sets up the selected available service in the wireless terminal.

The identification information includes a Mobile Identification Number assigned to the wireless terminal. The service information may be received in a form of, for example, an XML message.

The instructions may further cause the wireless terminal to perform a function of determining whether the wireless terminal has been activated or not, and the function of automatically initiating communication may be performed, upon determining that the wireless terminal has not been initialized. The function of determining whether the wireless terminal has been initialized or not may be performed upon detecting turning on power of the wireless terminal, or performed upon detecting an input of an instruction by a user through the user interface.

The one or more available services indicated by the service information may include one or more services which have not been pre-subscribed in the wireless terminal yet and/or include one or more services which have already been pre-subscribed in the wireless terminal. In such a case, the function of displaying a list of the one or more available services may be performed such that the one or more services which have already been pre-subscribed in the wireless terminal are displayed in a different manner from the one or more services which have not been pre-subscribed in the wireless terminal yet.

The instructions may further cause the wireless terminal to perform a function of determining whether an initialization instruction is input by a user, and the function of automatically initiating communication may be performed upon detecting the initialization instruction. The instructions may further cause the wireless terminal to perform a function of sending, to the server, a notification indicating that setting-up of the selected available service has been completed.

In another example, a server for setting a wireless terminal for a service includes a processor and a storage device storing a program. The program in the server may include instructions which, when executed by the processor, cause the server to perform several functions. For example the server receives communication and identification information from the wireless terminal. In response, the server finds stored customer information corresponding to the identification information, and determines one or more services which are available on or through the wireless terminal. The server sends, to the wireless terminal, service information indicating the one or more available services, and receives a request from the wireless terminal requesting an application program for setting up a user selected available service selected from the one or more available services. In response to the request, the server sends the application program for the selected service to the wireless terminal.

The identification information may include a Mobile Identification Number assigned to the wireless terminal. The service information may be sent in a form of, for example, an XML message.

The one or more available services indicated by the service information may include one or more services which have not been pre-subscribed (or activated) in the wireless terminal yet, and/or one or more services which have already been pre-subscribed (or activated) in the wireless terminal. The one or more available services indicated by the service information may include one or more services which the user has not yet purchased.

The instructions of the program in the server may further cause the server to perform functions of receiving, from the wireless terminal, a notification indicating that setting-up of the selected available service has been completed, and updating the stored customer information according to the notification.

The above mentioned programs in the wireless terminal or the server may be stored in non-transitory computer readable storage medium, such as a hard disk drive, a ROM, a RAM, a Flash memory, or optical/magnetic disks including CD-ROM, DVD-ROM and Blue-Ray® disks. The programs stored in such storage media may be transferred over a network including the Internet, after being read out from the storage medium. After such transfers, the program may be stored in media in the wireless terminal or server for read-out and execution.

The present method and apparatus, together with further objects and advantages, can be better understood by reference to the following detailed description and the accompanying drawings.

BRIEF DESCRIPTION OF THE DRAWINGS

FIGS. 5A-5D and 6A-6B are examples of various screen shots on a wireless terminal.
FIG. 7 is an example of an XML message returned by a server.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to initialization of a wireless terminal and setting-up and/or activating services available on the wireless terminal. Reference now is made in detail to the examples illustrated in the accompanying drawings and discussed below.

Figure 1:
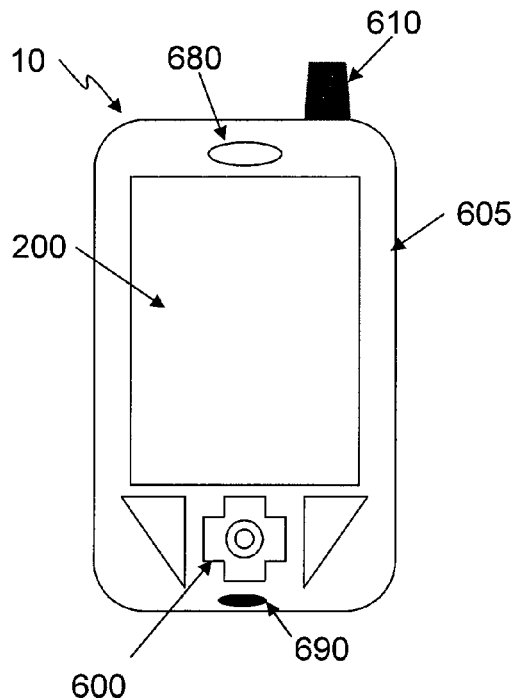
FIG. 1 is a front view of an exemplary wireless terminal.

FIG. 1 illustrates the front view of an exemplary wireless terminal. The wireless terminal 10, for example, a touch sensitive "smart" cellular phone, includes a main body 605, input keys 600, antenna 610, a speaker 680, a microphone 690 and a touch panel display 200. The configuration of the wireless terminal elements is not limited to the arrangement shown in FIG. 1.

Figure 2:
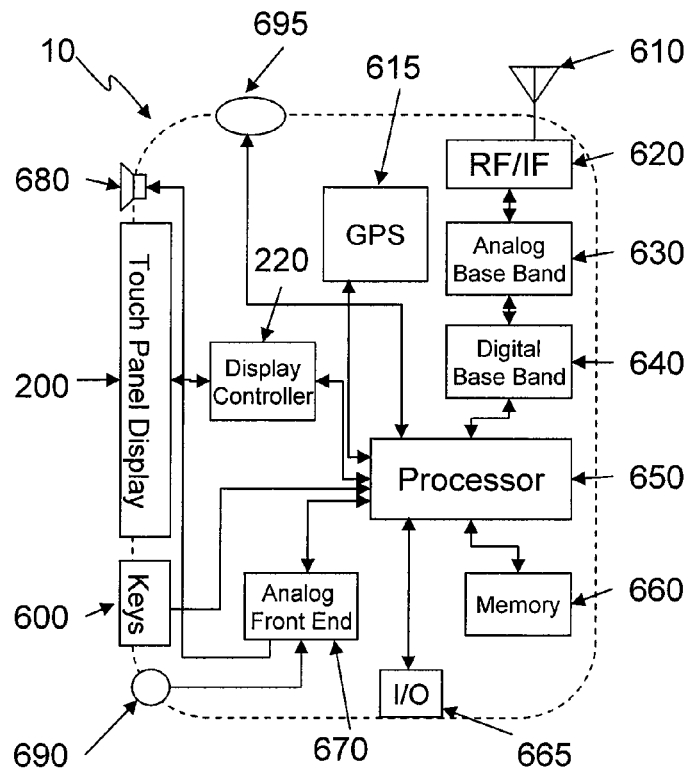
FIG. 2 is an exemplary block diagram of components of a wireless terminal.

FIG. 2 shows an exemplary block diagram of elements of the wireless terminal 10 of FIG. 1. The wireless terminal 10 includes an RF interface 620 connected to the antenna 610, an analog base band processor 630 and a digital base band processor 640 connected to a processor 650. A display controller or driver 220 is connected to the touch panel display 200 and the processor 650 for controlling the touch panel display 200. An analog front end processor 670 is connected to the processor 650 for controlling the speaker 680 and the microphone 690. The processor 650 in configured to control the display controller 220, RF circuits (620, 630 and 640), the analog front end processor, and an I/O circuit 665. The processor 650 also connects to memory 660 as a storage medium. The memory 660, for example, may include a RAM, a ROM or a flash memory. The memory 660 may store any number of application programs. The memory 660 also stores a program which realizes a method for initializing the wireless terminal and/or activating the services available on the wireless terminal as disclosed herein a part of or an entire of the wireless terminal may be so structured or configured by hardware to perform the method. Of course, the wireless terminal 10 may further include a GPS receiver 615.

Figure 3A:
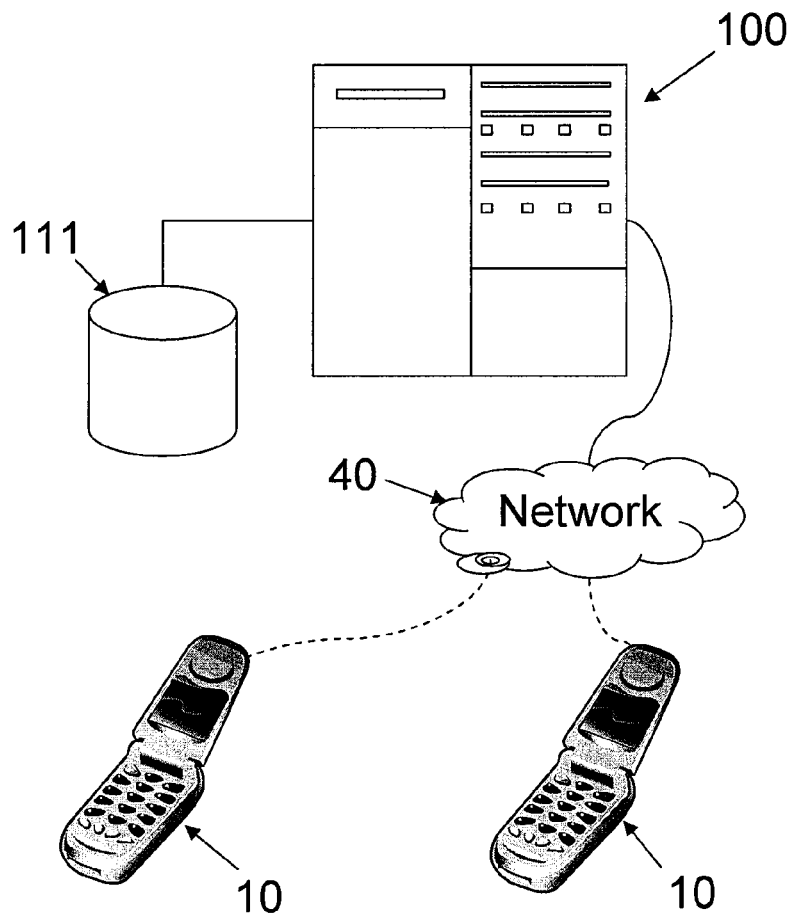
FIG. 3A is an exemplary block system diagram of server interaction with wireless terminals.
Figure 3B:
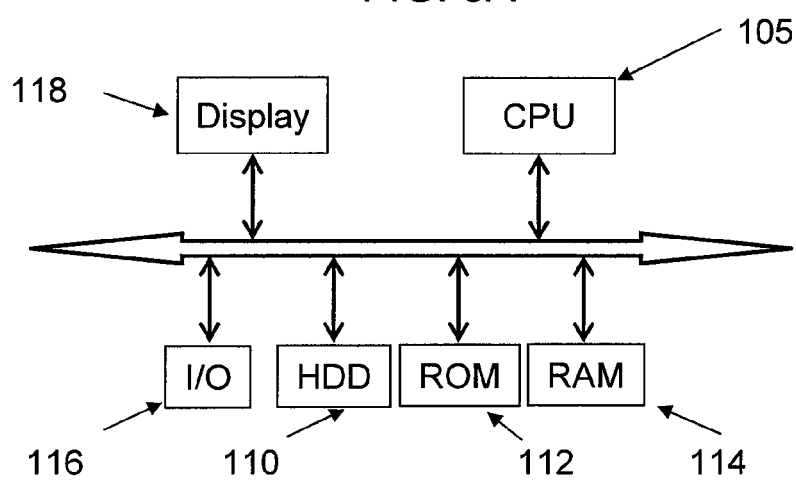
FIG. 3B is a functional block diagram of an exemplary server.

FIG. 3A is an exemplary block system diagram of server interaction with wireless terminals, and FIG. 3B is a functional block diagram of an exemplary server. As shown in FIG. 3B, the server 100 may be a computer system including a CPU 105 and a storage device 110, for example a hard disk drive (HDD). The HDD 110 may store application programs that run on the server. As shown in FIG. 3A, the server 100 may also include a ROM 112, a RAM 114, an I/O port 116 or a display 118. The server 100 is connected to network 40. One of HDD 110, ROM 112 and RAM 114 includes a program which, when executed by the CPU 105, causes the server 100 to perform the functions disclosed herein. Of course, a part of or the entire of the server may be structured or configured by hardware so as to perform the functions. Also, those skilled in the art will appreciated that the functions attributed to the one server may be implemented across a number of physically separate hardware platforms connected to the network in a distributed implementation.

Figure 4:
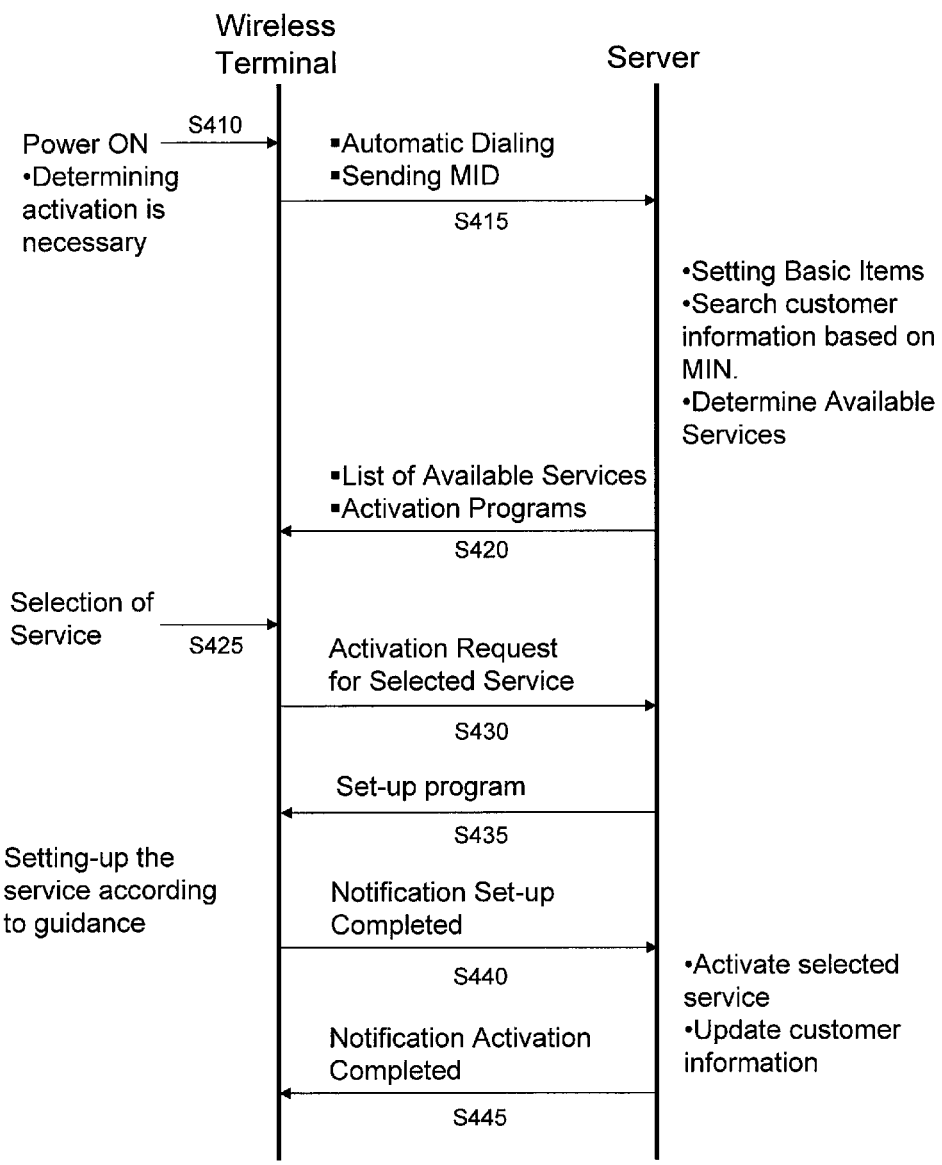
FIG. 4 is an example of a procedure for initializing a wireless terminal and/or activating services.

FIG. 4 illustrates one of the examples of a procedure to initialize the wireless terminal and activate and/or set-up services available on the wireless terminal. The procedure on the wireless terminal 10 may be realized by a preinstalled program stored in the memory 660 of the wireless terminal 10. Such a program may be downloadable from a server 100 and stored in the memory 660 of the wireless terminal.

When a customer purchases a new wireless terminal, he/she generally selects a rate plan and additional services available on the wireless terminal. In the following examples, service names and terms of Verizon Wireless are used for discussion and illustration purposes. The configuration technique of course may be applied to networks, terminals and servers of other service provides.

For example, assume that a customer purchased a rate plane which is eligible to subscribe the Friends & Family® service and also purchased a charged service (e.g., the VZ Navigator$^{SM}$ service). General free services, for example, a management program (e.g., MyVerizon®) and a Visual Voice Mail service may be available for all rate plans.

After purchasing the new wireless terminal, the customer turns on the wireless terminal for the first time. The terminal may be purchased and delivered to the customer, e.g., through the mail. It should be noted that a store representative may have already turned on the wireless terminal for testing or other purposes, but in this example, the wireless terminal is provided to the customer without being initialized for network service. Upon turned on, the wireless terminal 10 (processor 650) executes a boot-up program stored in, for example, a ROM. Hence, when the wireless terminal is turned on, the wireless terminal 10 (processor 650) executes the initialization and/or activation program stored in memory 660.

The executed program first causes the processor to determine whether the wireless terminal and the available services have already been initialized, activated and/or configured (S410). If the wireless terminal has been initialized and the available services have already been activated and configured, the program is terminated and the display 200 of the wireless terminal 10 displays a standby screen. At this time, the wireless terminal 10 may access the server 100 to inquire whether any new service is available for the wireless terminal 10. Here, the customer may choose starting activation at a later time.

If the wireless terminal has not been initialized or the available services have not already been activated and configured, the executed program causes the wireless terminal to automatically call a designated number for initialization, for example, *228 for establishing communication with the server 100 through a wireless network 40 (S415). At this time, the program may cause the display 200 to display a screen as shown in FIG. 5A to prompt the customer to start initialization.

The wireless terminal automatically, or upon detecting that the customer presses the "start" button, makes a call to establish the call to the Over-the-Air (OTA) programming application in the server 100. Then, the wireless terminal waits long enough for the call to be connected (see, FIG. 5B). When the call is connected, the wireless terminal automatically sends a tone, for example that for a dialed digit "1," corresponding to select a "Program your phone" type option. Dialing *228 will also initiate a process to update the latest Preferred Roaming Partner list (PRL) loaded to the wireless terminal 10. The PRL is a file downloadable to the wireless terminal, ensuring that the wireless terminal connects to the appropriate carrier's network in a particular location as the customer roams. It should be noted that the wireless terminal 10 may decide whether the wireless terminal has been initialized or not by checking if the PRL has already been loaded, as the PRL is loaded upon initialization.

The program then causes the wireless terminal 10 to display a screen such as the example shown in FIG. 5C to prompt the customer to select default setting or custom setting. For example, the default setting may list both general free services and the services that the customer has already subscribed but not yet been activated on the wireless terminal, while the custom setting may list the subscribed services, free services and recommended services available to the customer.

Then, the wireless terminal 10 accesses the server 100 and sends identification information to the server 100 (S415). The identification information includes a Mobile Identification Number (MIN) which is assigned to and identifies the wireless terminal. The identification information may be a phone number assigned to the wireless terminal (i.e., the customer) or a manufacturing serial number of the wireless terminal.

The server 100 is programmed to execute server side functions. The server 100 may include one or more processors and one or more storage device storing a server side program. The server side program includes instructions which, when executed by the one or more processors, cause the server to perform the server side functions. The one or more storage devices may further include customer database 111 stored in the HDD 110 including customer information.

When the server 100 receives the identification information, the server 100 searches the customer database 111 to find the customer information corresponding to the received identification information. The customer information may include the customer name, address, the Mobile Identification Number of the wireless terminal which the customer purchased, a rate plan, billing information and/or optional services which the customer has purchased or subscribed. For example, when the customer purchased the wireless terminal, the identification information (e.g., MIN) and information indicating available and the purchased services were sent to the server 100 and stored in the customer database 111. Thus, when the server 100 found the customer information based on the received identification information, the server 100 can determine which services are available on or through the purchased wireless terminal. If some of the services have already been activated or set up in the wireless terminal, the customer information indicates that those services have already been activated on the wireless terminal. In other words, the customer database 111 stores information about which services are available on the purchased wireless terminal and which services have or have not been activated or set up in the purchased wireless terminal.

After the server 100 finds the customer information corresponding to the received identification information, the server 100 creates service information indicating the one or more available services which are available on or through the wireless terminal corresponding to the identification information and sends that service information back to the wireless terminal 10 (S420).

The service information may be an XML message as shown in FIG. 7. As the example shown in FIG. 7 illustrates, the list of subscribed features purchased and still requiring setup are represented as having a "Setup" value of "false." If the features purchased have already been set up, the vale of "Setup" may be "true."

When the wireless terminal 10 receives the service information, the wireless terminal 10 displays the list of available services on the display 200 of the wireless terminal as shown in FIG. 5D. In FIG. 5D, all services need to be activated or set up. If there are services not having been set up, the services which have already been activated or set-up in the wireless terminal may be displayed in a different manner from the services which have not been set-up in the wireless terminal yet. Then, the customer may select one or more available services displayed by, for example, touching a displayed "Download" touch button for setting up the selected services (S425). Other types of user interface (e.g., a keypad) may be employed to enter the selection.

Figure 6A:
Figure 6B:

As shown in FIG. 6B, if the customer is not familiar with the displayed services, the customer may touch information button "i" to display the details of the service.

Upon detecting the selection of available services from the services displayed on the display panel 200 through the user interface, the wireless terminal 10 sends a request to the server 100 requesting download of an application program for the selected available service (S430).

When the server 100 receives the request, the server 100 sends a corresponding application program to the wireless terminal 10 (S435). If multiple services are selected, the application programs may be downloaded at the same time (see, FIG. 6A) or downloaded one after another upon completing of the one application program. The application program may be pre-stored in the wireless terminal. In this case, the application program is not downloaded from the server 100 to the wireless terminal 10. The pre-stored application program instead might be activated to run in response to a command from the server. However, if the application program stored in the wireless terminal 10 is not up-to-date version, the latest version of the application program may be downloaded from the server 100 to the wireless terminal 10.

The application program downloaded to the wireless terminal is executed by the processor 650 of the wireless terminal 10. During the setting-up, the executed application program may display guidance or tutorial information about how to set-up and activate the selected service so that the customer can easily activate and set-up the selected service in the wireless terminal 10.

When the setting-up of the selected service is successfully completed, the wireless terminal 10 may send a notification indicating that setting-up of the selected available service has been completed to the server 100 (S440). Upon receiving the notification, the server 100 activates the selected service for making the service available on or through the wireless terminal by the customer. At the same time, the server 100 may update the customer information stored in the database 111 to reflect the completion of the activation and set-up. Then, the server 100 may further send a notification indicating that the activation has successfully been completed to the wireless terminal 10 (S445).

If more than one services are selected by the customer for activation and set-up, Steps 430, 435, 440 and 445 may be repeated.

The customer may be able to exit the activation program and/or the application program at any time, and may restart at the same location of the program where terminated. It may be possible that the programs may give the customer option to save location on exit. The activation program and/or the application program may be on the desktop of the wireless terminal and allow the customer to run at any time.

In another embodiment, the service information may include one or more services which the customer has not yet purchased. Such services may be new services which were not available when the customer purchased the wireless terminal. In such a case, the un-purchased services may be displayed in a different manner from the purchased services. If the customer selects one of the un-purchased services, which means that the customer decides to purchase or subscribe the service, the wireless terminal 10 sends the selection of the service (i.e., a request for subscription) that the customer desires to purchase to the server 100. The server 100 processes the request and makes the service available on or through the wireless terminal of the customer. The activation or set-up of the newly purchased service may be the same as set forth above.

The method for activating and setting a wireless terminal for a service and relating devices or programs disclosed herein provides numerous advantages over conventional activating and setting method. For example, the disclosed method minimizes the customer's work or process to set up the service in the wireless terminal, and makes the set-up more efficiently. The disclosed method makes the set-up more accurate and/or complete by the use of guidance displayed on the wireless terminal. The method further provides the customer opportunities to purchase new services which are available on or through the customer's wireless terminal.

As shown by the above discussion, at least some implementations for activation and service set-up for a wireless terminal may involve programming, for example, for the processor of the wireless terminal and/or for the server unit. Program aspects of the technology may be thought of as "products" or "articles of manufacture" typically in the form of executable code and/or associated data that is carried on or embodied in a type of machine readable medium. "Storage" type media include any or all of the memory of the supporting electronics of the terminal or server that executes the respective program, such as various semiconductor memories, tape drives, disk drives and the like, which may provide storage at any time for the software programming. All or portions of the software may at times be communicated through the Internet, the wireless network serving the terminals or various other telecommunication networks. Such communications, for example, may enable loading of the software from one computer or processor into another computer or processor, for example, from a host or management server into the download server or into the wireless terminal devices.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

We claim:

1. A method for setting a wireless terminal for a service, the method comprising steps of:

automatically sending identification information identifying the wireless terminal to a server by automatically dialing a predetermined number;

upon receiving the identification information by the server, finding, by the server, stored customer information corresponding to the identification information;

based on the found customer information, determining by the server one or more available services which are available on or through the wireless terminal;

sending service information indicating the one or more available services from the server to the wireless terminal;

displaying a list of the one or more services available for download on the wireless terminal as a download display;

upon detecting a selection of an available service from the one or more available services displayed on the wireless terminal, sending an application program from the selected available service by the server to the wireless terminal;

executing the application program on the wireless terminal to setup the available services including displaying, separate from the download display, guidance including information about how to set up the selected available service according to the application program; and in response to user inputs based on the displayed guidance, setting up the selected available service in the wireless terminal.

2. A wireless terminal, comprising:
a wireless transceiver for communication via a wireless network;
a processor coupled to the wireless transceiver;
a user interface coupled to and controlled by the processor to present information to a user and to receive input from the user; and
a storage device storing a program,
wherein the program includes instructions which, when executed by the processor, cause the wireless terminal to perform functions including functions to:
automatically initiate communication through the wireless network using a predetermined number, to establish communication between the wireless terminal and a server;
send identification information that identifies the wireless terminal to the server;
receive, from the server, service information that indicates one or more available services which are available on or through the wireless terminal corresponding to the identification information;
display on the wireless terminal a list of the one or more services available for download as a download display;
upon detecting a selection of an available service from the one or more available services displayed on the wireless terminal through the user interface, send a request to the server;
download an application program to set up the selected available service;
execute the application program to display guidance, separate from the download display, that includes information about how to set up the selected available service according to the downloaded application program; and
set up the selected available service in the wireless terminal.

3. The wireless terminal according to claim 2, wherein:
the instructions further cause the wireless terminal to perform a function to determine whether the wireless terminal has been initialized or not, and
the function to automatically initiate communication is performed, upon determining that the wireless terminal has not been initialized.

4. The wireless terminal according to claim 3, wherein the function to determine whether the wireless terminal has been initialized or not is performed upon detecting turning on power of the wireless terminal.

5. The wireless terminal according to claim 3, wherein the function to determine whether the wireless terminal has been initialized or not is performed upon detecting an input of an instruction by a user through the user interface.

6. The wireless terminal according to claim 2, wherein the one or more available services displayed in the download display, include one or more services to which the user has subscribed and which have not been activated in the wireless terminal yet and one or more services to which the user has not subscribed.

7. The wireless terminal according to claim 6, wherein the one or more available services indicated by the service information further include one or more services which have already been activated and are available in the wireless terminal.

8. The wireless terminal according to claim 7, wherein the function to display on the wireless terminal a list of the one or more available services is performed such that the one or more services which have already been activated and available in the wireless terminal are displayed in a different manner from the one or more services which have not been activated in the wireless terminal yet and to the one or more services to which the user has not subscribed.

9. The wireless terminal according to claim 2, wherein the identification information includes a Mobile Identification Number assigned to the wireless terminal.

10. The wireless terminal according to claim 2, wherein the service information is received in a form of an XML message.

11. The wireless terminal according to claim 2, wherein:
the instructions further cause the wireless terminal to perform a function to determine whether an activation instruction is input by a user; and
the function to automatically initiate communication is performed upon detecting the activation instruction.

12. The wireless terminal according to claim 2, wherein the instructions further cause the wireless terminal to perform a function to send, to the server, a notification indicating that setting-up of the selected available service has been completed.

13. The wireless terminal according to claim 3, wherein the instructions to cause the wireless terminal to perform a function to determine whether the wireless terminal has been initialized or not include instructions to check whether or not a preferred roaming partner list (PRL) has been loaded to the wireless terminal.

14. A server for setting a wireless terminal for a service, the server comprising:
a processor; and
a storage device storing a program,
wherein the program includes instructions which, when executed by the processor, cause the server to perform functions including functions to:
receive a communication from the wireless terminal;
receive identification information of the wireless terminal;
find stored customer information corresponding to the identification information;
determine one or more available services which are available on or through the wireless terminal based on the found customer information;
send, to the wireless terminal, service information that indicates the one or more services available for download, to be displayed on the wireless terminal as a download display;
receive a request, from the wireless terminal, that requests an application program to set up a user selected available service selected from the one or more available services; and
send the application program to the wireless terminal, wherein:
the application program comprises guidance including information about how to set up the selected available service, and when the application program is executed on the wireless terminal, the guidance, separate from the download display, is displayed on the wireless terminal.

15. The server according to claim 14, wherein the one or more available services indicated by the service information include one or more services which have not been available in the wireless terminal yet.

16. The server according to claim 15, wherein the one or more available services indicated by the service information further include one or more services which have already been activated and available in the wireless terminal.

17. The server according to claim 14, wherein the one or more available services indicated by the service information include one or more services which the user has not yet purchased.

18. The server according to claim 14, wherein the identification information includes a Mobile Identification Number assigned to the wireless terminal.

19. The server according to claim 14, wherein the service information is sent in a form of an XML message.

20. The server according to claim 14, wherein the instructions further cause the server to perform function to:
   receive, from the wireless terminal, a notification that indicates that setting-up of the selected available service has been completed; and
   update the stored customer information according to the notification.

21. A non-transitory computer readable storage medium storing a program, wherein the program includes instructions which, when executed by a processor of a wireless terminal, cause the wireless terminal to perform functions including functions to:
   automatically initiate communication through a wireless network using a predetermined number to establish communication between the wireless terminal and a server;
   send identification information that identifies the wireless terminal to the server;
   receive, from the server, service information that indicates one or more available services which are available on or through the wireless terminal corresponding to the identification information;
   display on the wireless terminal a list of the one or more services available for download as a download display;
   upon detecting a selection of available service from the one or more available services displayed on the wireless terminal, send a request to the server;
   download an application program to set up the selected available service;
   execute the application program to display guidance, separate from the download display, that includes information about how to set up the selected available service according to the downloaded application program; and
   send up the selected available services in the wireless terminal.

22. A method of transferring electronic data, the method comprising functions to:
   reading out, by using a computer, the program stored in the non-transitory computer readable storage medium according to claim 21; and
   transferring the read-out program over a network.

* * * * *